United States Patent
Gebhard (10) Patent No.: US 9,713,835 B2
(45) Date of Patent: Jul. 25, 2017

(54) TRANSFER ARRANGEMENT FOR A PRESS OR PRESS LINE WITH AN AXIAL DRIVE AND INTERCHANGEABLE BASE

(75) Inventor: Markus Gebhard, Bohmkirch-Treffelhausen (DE)

(73) Assignee: Schuler Pressen GmbH, Goppingen (DE)

( * ) Notice: Subject to any disclaimer, the term of this patent is extended or adjusted under 35 U.S.C. 154(b) by 0 days.

(21) Appl. No.: 14/110,288

(22) PCT Filed: Apr. 5, 2012

(86) PCT No.: PCT/EP2012/056250
§ 371 (c)(1),
(2), (4) Date: Nov. 5, 2013

(87) PCT Pub. No.: WO2012/136750
PCT Pub. Date: Oct. 11, 2012

(65) Prior Publication Data
US 2014/0056670 A1    Feb. 27, 2014

(30) Foreign Application Priority Data
Apr. 8, 2011   (DE) .................. 10 2011 001 924

(51) Int. Cl.
*B21D 43/00*   (2006.01)
*B21D 43/05*   (2006.01)
*B25J 11/00*   (2006.01)

(52) U.S. Cl.
CPC ......... *B21D 43/003* (2013.01); *B21D 43/057* (2013.01); *B25J 11/005* (2013.01)

(58) Field of Classification Search
CPC ...... B21D 43/05; B21D 43/10; B21D 43/003; B21D 43/057; F16D 11/08; B25J 11/005
(Continued)

(56) References Cited

U.S. PATENT DOCUMENTS 2,803,323 A * 8/1957 Newell ................... F16D 11/10
                                                                    192/18 R
6,244,814 B1   6/2001 Herbermann
(Continued)

FOREIGN PATENT DOCUMENTS

| DE | 10324272 B3 | 3/2005 |
|----|-------------|--------|
| EP | 0818254 A2  | 1/1998 |
| EP | 1862237 A1  | 12/2007 |

*Primary Examiner* — Gerald McClain
*Assistant Examiner* — Ronald Jarrett
(74) *Attorney, Agent, or Firm* — R. S. Lombard (57) ABSTRACT

The invention is a transfer arrangement for transporting and/or positioning and/or aligning a workpiece and is used in particular in presses or press lines. A cross member can be moved and/or pivoted in a plurality of directions in space. The movement of the cross member is controlled or regulated by means of a control unit and by means of a corresponding number of axial drives. A servomotor is located on the cross member. A base support can be coupled to the cross member and a drivable shaft is arranged on the base support. A coupling arrangement of the cross member interacts with a mating connecting means on the base support to establish the mechanical fastening. A coupling means interacts with a mating coupling means to establish a rotational connection between the servomotor and the drivable shaft. A workpiece gripping arrangement is present on the base support.

13 Claims, 7 Drawing Sheets

(58) Field of Classification Search
USPC .......................................... 192/15, 16, 18 R
See application file for complete search history.

(56) References Cited

U.S. PATENT DOCUMENTS

| | | | |
|---|---|---|---|
| 7,128,198 B2* | 10/2006 | Yoshida | B23Q 1/5468 198/468.4 |
| 2007/0051157 A1* | 3/2007 | Shiroza | 72/405.1 |
| 2009/0292298 A1* | 11/2009 | Lin et al. | 606/130 |

* cited by examiner

TRANSFER ARRANGEMENT FOR A PRESS OR PRESS LINE WITH AN AXIAL DRIVE AND INTERCHANGEABLE BASE

CROSS REFERENCE TO RELATED APPLICATION

The present patent application is based upon and claims the benefit of German patent application no. 102011 001 924.3 filed Apr. 8, 2011 and PCT application no. PCT/EP2012/056250, filed Apr. 5, 2012.

BACKGROUND OF THE INVENTION

The invention relates to a transfer arrangement for transporting and/or aligning a workpiece. The workpiece is in particular a sheet metal or a sheet metal part, which has already been processed, which is conveyed to a press or a press stage of a press line for further processing and which is placed into a processing position. For this purpose, the transfer arrangement encompasses at least one cross member, which can be moved and/or pivoted in a plurality of directions in space. An interchangeable base support is coupled to the cross member via a coupling arrangement so as to be capable of being released. The base support supports a workpiece gripping arrangement for gripping the workpiece. The transfer arrangement is provided and equipped to be able to interchange the base support automatically. That is, a coupled base support can be removed and a new base support can be coupled Such a transfer arrangement is known from DE 10 2006 025 272 B3, for example. Due to movements of the cross member, the base support can be unlocked and removed by means of the workpiece gripping arrangement and a new base support can be accommodated. An automatic tool interchange, that is, an automatic interchange of the tool gripping arrangement is possible with the help of the axles of the transfer arrangement.

A transfer arrangement for a press is known from DE 100 09 574 A1. Movably arranged workpiece-specific suction members are present on the cross member, wherein the suction members represent a workpiece gripping arrangement. A spindle-nut system is arranged on the cross member for moving or pivoting the suction members. This spindle-nut system can be controlled by means of a drive, which is arranged on a pivotable mount. The cross member is fastened to the pivotable mount 17.

SUMMARY OF THE INVENTION

Based on this known state of the art, it can be considered to be a task of the instant invention to increase the flexibility of the transfer arrangement and in particular to provide for an automatic interchange of the workpiece gripping arrangement by means of the axial drives of the transfer arrangement or of the cross member, respectively.

This task is solved by means of a transfer arrangement comprising the features of patent claim 1 as well as a base support for a transfer arrangement comprising the features of patent claim 9.

Advantageous embodiments of the invention follow from the dependent patent claims as well as from the description. The invention is explained in the description by means of a preferred exemplary embodiment. The description is limited to the significant features of the invention. The drawing should be used as a supplement.

DETAILED DESCRIPTION OF THE INVENTION

In the case of the instant invention, the coupling arrangement for releasably coupling the base support, which is equipped with a drivable shaft, to the cross member, encompasses a connecting means and a coupling means. The connecting means of the cross member serves to interact with a mating connecting means on the base support. A releaseable mechanical fastening between base support and cross member is attained via the connecting means and the mating connecting means. The mechanical connection between cross member and base support can be established or released, respectively, by means of a linear movement or a sequence of linear movements, respectively, of the cross member.

The coupling means of the cross member serves to interact with a mating coupling means on the base support. The couplings means is connected to the motor shaft of the drive motor so as to be capable of being driven by means of a drive motor of the cross member and in particular directly, and can thereby be arranged coaxially to the motor shaft. In the coupling state, the coupling means and the mating coupling means establish a torque-proof connection between the drive motor of the cross member and the shaft of the base support. Preferably, a rotational connection is thereby established in both directions of rotation. In axial direction, the coupling means and the mating coupling means can be in contact with one another when a coupling has been established, whereby a tight connection in axial direction, is not established, however. It is thus possible to automatically establish or release, respectively, a mechanical connection between base support and cross member and simultaneously a coupling between drivable shaft and drive motor in a simple manner by moving the cross member. A workpiece gripping arrangement, which is arranged on the base support, can be moved and/or pivoted via the drive motor of the cross member and the drivable shaft on the base support, in particular so as to attain a provided positioning or alignment of the workpiece. For this purpose, it is not necessary to move the entire cross member, but only the workpiece gripping arrangement on the base support.

In the event that a transfer arrangement encompasses a plurality of cross members, which are in particular supported on a common part and which can only be moved to a limited extent relative to one another, the two workpiece gripping arrangements can be brought into different positions or locations very easily independent from one another due to the embodiment according to the invention.

It can be advantageous, when the connecting means can be coupled to the mating connecting means and when the coupling means can be connected to the mating coupling means by means of a relative movement of the cross member and preferably by means of a linear relative movement of the cross member relative to the base support in a coupling direction. Vice versa, the coupling can be released by means of a movement in opposite direction. After the coupling, a locking can be established between the connecting means and the mating connecting means by lifting the coupled base support. Prior to the decoupling, an unlocking of the connecting means and of the mating connecting means can take place by placing the base support onto a storage surface, so that an decoupling can take place between cross member and base support by means of a relative movement, which is directed opposite the coupling direction. The coupling direction preferably runs parallel to the longitudinal axis of the cross member.

In the case of the preferred exemplary embodiment, the transfer arrangement encompasses a control unit, which is equipped to control the movement and/or the position of the cross member and to drive the drive motor of the cross member. Via the control unit, the movement position and alignment of the cross member can thus be controlled with respect to a base support. It is advantageous thereby, when the control unit brings the coupling means, which is connected to the drive motor, into a provided coupled position, so as to establish the coupling between the coupling means and the mating coupling means. The coupled position thereby corresponds to a preferred rotational position of the coupling means about the drive axle of the drive motor.

An electric motor, in particular a servomotor, preferably serves as drive motor.

In the case of a preferred exemplary embodiment, the coupling means encompass an unlocking means, which cancels a rotational locking of the mating coupling means when the torque-proof coupling is established. In the decoupled state, the rotation of the mating coupling means is blocked, so as to hold the mating coupling means in a rotational position, in which the coupling means can be coupled axially. This rotational locking of the mating coupling means is cancelled by establishing the coupling, so that a rotation of the shaft is made possible via the drive motor.

The cross member is preferably only supported on one of its two longitudinal ends. The positioning and aligning of the cross member is simplified through this. In contrast to two-sided supports, a longitudinal change of the cross member as a function of the inclination is not required.

Preferably, the transfer arrangement encompasses a plurality of different base supports or base support types, respectively. The respective required base support can then be coupled and used as a function of the use and of the application of the transfer arrangement on a press or a press line between two press stages. The transfer arrangement can thus also be adapted quickly and easily to different workpieces during the operation. E.g., the base support of the transfer arrangement can also be interchanged automatically in response to an automatic tool interchange of the press or of the press line, respectively.

A locking means, which, in the separated state of the mating coupling means from the coupling means, fixes the rotational position of the mating coupling means in a coupled position, is preferably present on the base support. For example, the locking means can encompass at least one locking projection, which, in the locked position, engages with a locking recess on the mating coupling means, which is arranged at a distance to the axis of rotation. A rotation of the mating coupling means can be blocked in this manner, so that the mating coupling means is fixed in a position, in which a coupling to the coupling means is possible. The locked position can thereby be established in a very simple manner in that the locking means is pretensioned in its locked position by means of a pretensioning arrangement. The pretensioning arrangement can encompass a spring or a different elastic element, for example, for generating the pretensioning force.

In a preferred embodiment, the drivable shaft is embodied as a threaded spindle. A spindle nut, which represents an output member, which can be moved by means of the shaft, is located on the threaded spindle. The output member serves to move or pivot the workpiece gripping arrangement and is thus connected to the workpiece gripping arrangement via a gear drive. The threaded spindle and the spindle nut only require a slight installation space on the base support. In addition, the coupling between the threaded spindle and the spindle nut can be embodied so as to be self-locking, so that the drive motor does not need to accommodate any torques during operation and thus needs to be operated only for adjusting the workpiece gripping arrangement. In addition or as an alternative, the gear drive between the output member and the workpiece gripping arrangement can also be embodied so as to be self-locking.

A linear movement of the workpiece gripping arrangement and/or a pivot movement of the workpiece gripping arrangement can be caused via the gear drive. In the case of one embodiment, a support carriage, which is supported on the base support so as to be linearly displaceable and which supports the workpiece gripping arrangement, can be arranged on the base support. In the alternative or in addition, the workpiece gripping arrangement can be supported so as to be pivotable about a pivot axis. The output member can then be connected to a pivot element, which is arranged on the workpiece gripping arrangement, at a location, which is spaced apart from the pivot axis.

Figure 1:
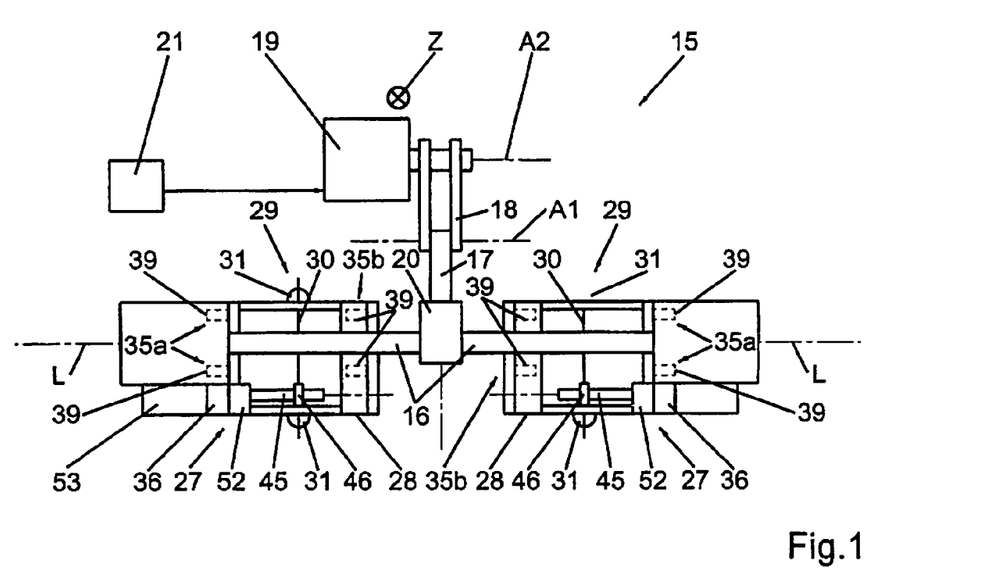
FIG. 1 shows a schematic, block diagram-like illustration of an exemplary embodiment of the transfer arrangement.
Figure 2:
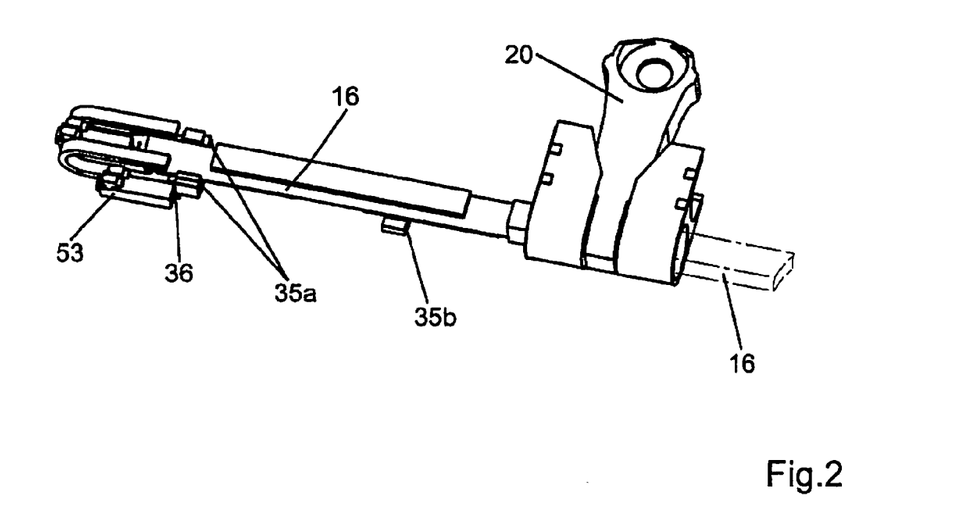
FIG. 2 shows a perspective partial illustration of a cross member of the transfer arrangement according to FIG. 1.

FIG. 1 illustrates an exemplary embodiment of a transfer arrangement 15 in a block diagram-like manner. The transfer arrangement 15 serves to transport and to position a workpiece, which is not shown in detail, in particular of a sheet metal part to a subsequent press or press stage, respectively. The transfer arrangement accommodates a sheet metal part in an accommodating position and places it into the press or press stage, respectively, in the desired processing position.

The transfer arrangement 15 encompasses a cross member 16, which can be rotated and/or pivoted in a plurality of directions in space. In the case of the exemplary embodiment, the cross member 16 is supported on an arm 17 so as to be capable of being rotated about its longitudinal axis L. In the case of the preferred exemplary embodiment described herein, two cross members 16 are arranged on an arm 17. The longitudinal axes L of the two cross members 16 are aligned. The two cross members 16 are immovable relative to one another. The arm 17 is supported on a pivot lever 18 so as to be pivotable about a first axis A1. The pivot lever 18 is supported on a column 19 so as to be pivotable about a second axis A2 and so as to be linearly adjustable in a height direction Z. The first axis A1 and the second axis A2 are aligned parallel to one another. In the case of the exemplary embodiment, the arm 17 encompasses a rotatably supported bearing part 20, on which the two cross members 16 are arranged so as to be capable of being rotated about their respective longitudinal axis L.

It goes without saying that, as an alternative to the exemplary embodiment described herein, various pivot or linear axes can be present. The individual axial drives of the transfer arrangement 15 are activated by means of a control unit 21. The control unit 21 can thus control the movement and the position and the alignment of the cross members 16.

Figure 8:
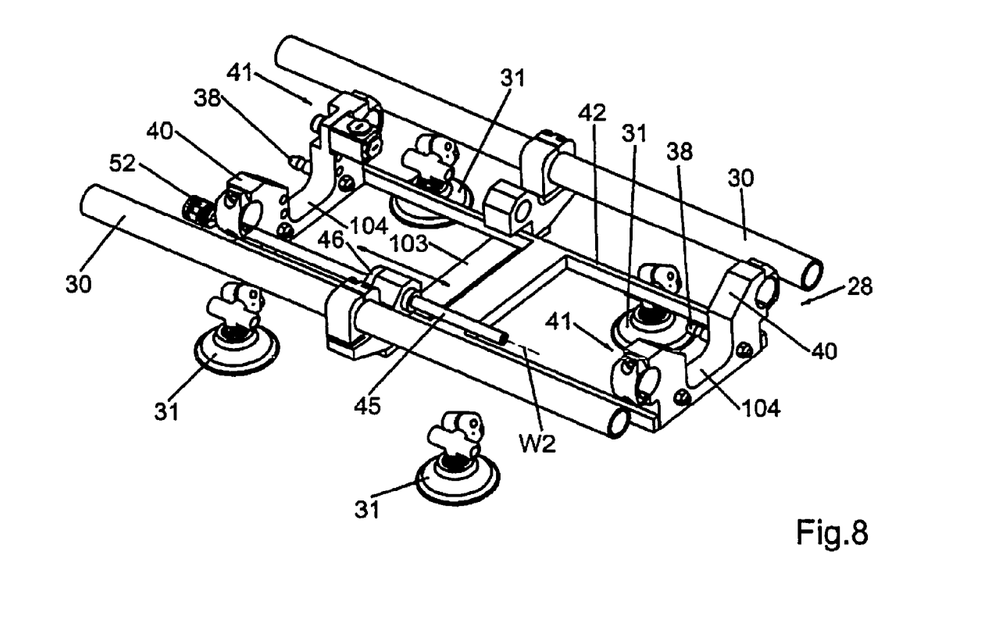
FIG. 8 shows a further exemplary embodiment of a base support comprising a support carriage for displacing a workpiece gripping arrangement.

Each cross member 16 encompasses a coupling arrangement 27, via which a base support 28 can be releasably connected to the cross member 16. A workpiece gripping arrangement 29, which is illustrated in FIG. 1 in a highly schematized manner, is arranged on the base support 28. The workpiece gripping arrangement 29 serves to hold the workpiece during the transport through the transfer arrangement 15. For this purpose, the workpiece gripping arrangement 29 in the case of the exemplary embodiment encompasses a bar 30, on which one or a plurality of suction elements 31 are arranged. By generating a low pressure on the suction elements 31, a workpiece in the form of a sheet metal part can be held on the workpiece gripping arrangement 29 in a friction-locked manner. The number of the suction elements 31 for each workpiece gripping arrangement 29 can vary. A workpiece gripping arrangement can also encompass a plurality of bars 30, in each case comprising one or a plurality of suction elements 31, as is illustrated in FIG. 8, for example.

In the schematic illustration of the exemplary embodiments, the fastening of the suction elements 31 on the bars 31 is not illustrated in detail. The connection is only suggested in an extremely schematic dotdashed manner. For the sake of clarity, suction lines and/or electrical lines have been omitted in the drawings as well.

On the one hand, the coupling arrangement 27 of the cross member 16 encompasses a connecting means 35 and, on the other hand, a coupling means 36. The connecting means 35 serves to establish the mechanical connection between the base support 28 and the cross member 16. For this purpose, the connecting means 35 interacts with a mating connecting means 37 on the base support 28. In the case of the exemplary embodiment described herein, a plurality of connecting pins 38, which are aligned parallel to one another, are present on the base support 28 as mating connecting means 37. A connecting hole 39, with which the connecting pin 38 engages once the connection has been established, is assigned to each connecting pin 38 on the cross member 16. The connecting holes 39 serve as connecting means 35. The connecting means 35 can be divided into groups 35a, 35b and can encompass connecting holes 39, which are arranged in groups or in pairs, wherein provision is made according to the example for two groups 35a, 35b, in each case comprising 2 connecting holes 39. The same applies to the mating connecting means 37.

Figures 3, 4:
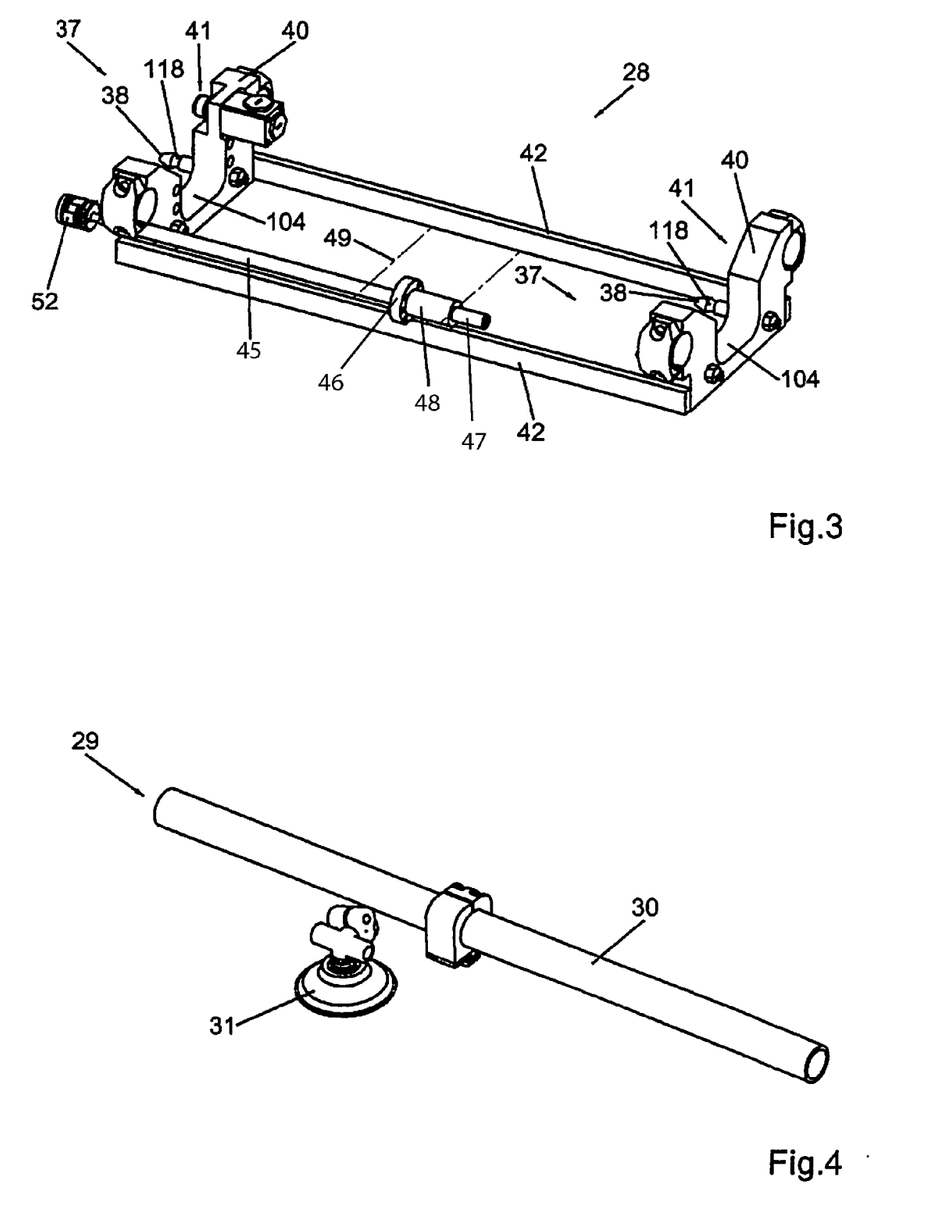
FIG. 3 shows a perspective illustration of an exemplary embodiment of a base support.
FIG. 4 shows a perspective illustration of an exemplary embodiment of a workpiece gripping arrangement.

FIG. 3 shows the basic design of a preferred exemplary embodiment of a base support 28. The base support 28 encompasses two end pieces 40, which are spaced apart from one another and on which the connecting pins 38 are arranged. The connecting pins 38 project away from a connecting surface 41 of the respective end piece 40 in the same direction. The two end pieces 40 are connected to one another via two longitudinal bars 42, which are aligned substantially parallel to one another. The two longitudinal bars 42 run parallel to the connecting pins 38.

The base support 28 further encompasses a drivable shaft 45, the rotation of which serves to move an output member 46. In the case of the exemplary embodiment described herein, the shaft 45 is embodied as threaded spindle 47, on which a spindle nut 48, which can be axially displaced along the threaded spindle 47, is arranged. The spindle nut 48 is located on the threaded spindle 47 in a torque-proof manner. The output member 46 or the spindle nut 48, respectively, is connected to the workpiece gripping arrangement 29 via a gear drive 49. The movement of the output member 46 is transferred to the workpiece gripping arrangement 29 via the gear drive 49, so that said workpiece gripping arrangement 29 can be moved and/or pivoted linearly. This will be explained in more detail below by means of the different exemplary embodiments of the base support 28.

Provision is further made on the base support 28 for a mating coupling means 52, which establishes a torque-proof connection with the coupling means 36 once the connection between the base support 28 and the cross member 16 has been established. The coupling means 36 of the cross member 16 is connected to a drive motor 53 in a torque-proof manner. In the case of the preferred exemplary embodiment, the mating coupling means 52 is arranged directly with the shaft 45 in a torque-proof manner and coaxially thereto, as can be seen from FIGS. 9 to 12. The coupling means 36 is located on a drive shaft 54 of the drive motor 53. The drive motor 53 is embodied as an electric motor and in particular as servomotor. Once the coupling between the coupling means 36 and the mating coupling means 52 has been established, the longitudinal axis W1 of the drive shaft 54 corresponds to the longitudinal axis W2 of the driven shaft 45 (see FIGS. 10 and 12).

In the case of the exemplary embodiments of the coupling means 36 or of the mating coupling means 52, respectively, described herein, only a coupling in the direction of rotation about the longitudinal axes W1, W2 is established once the coupling has been established. For this purpose, provision is made either on the coupling means 36 or on the mating coupling means 52 for coupling recesses 55, which are open in the direction of the longitudinal axis W1 or W2, respectively, and to which a coupling projection 56 is in each case assigned on the respective other means 52 or 36, respectively. In the case of the exemplary embodiment, two coupling projections 56 and two coupling recesses 55 are present, which are arranged diametrically opposite on both sides of the respective longitudinal axis W1 or W2, respectively. The coupling means 36 as well as the mating coupling means 52 encompass a substantially cylindrical body 57, on which either the coupling projections 56 or the coupling recesses 55 are arranged. In the case of the first exemplary embodiment according to FIGS. 9 and 10, the coupling projections 56 project away from a coupling surface 58 of the cylindrical body 57 of the coupling means 36. Assigned to the coupling surface 58, the body 57 of the mating coupling means 52 encompasses a mating coupling surface 59, to which the coupling recesses 55 lead.

A locking means 63 is assigned to the mating coupling means 52 on the base support 28, which is only illustrated in a partially schematic manner in FIGS. 9 to 12. The locking means 63 serves the purpose of holding the mating coupling means 52 and, according to the example, the cylindrical body 57, in a predetermined rotational position, in which a coupling to the coupling means 36 is possible by means of a relative movement between the cross member 16 and the base support 28 in the direction of the longitudinal axis L of the cross member 16 and thus in the direction of the longitudinal axes W1 and W2 of the drive shaft 54 and of the driven shaft 45.

Figure 9:
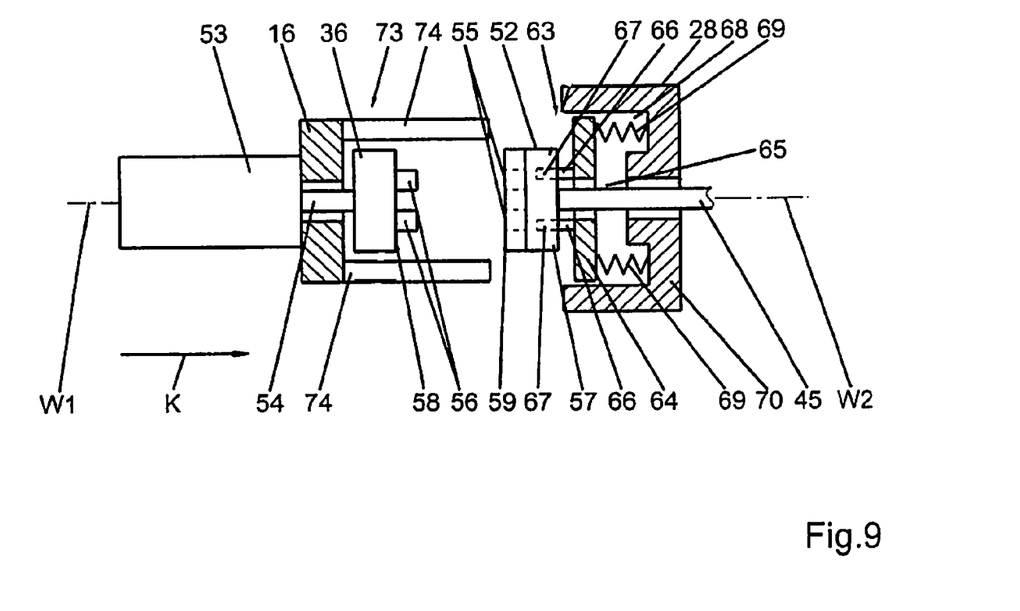
FIG. 9 shows a schematic block diagram-like partially cut illustration of a first exemplary embodiment of a coupling arrangement in the decoupled state.
Figure 10:
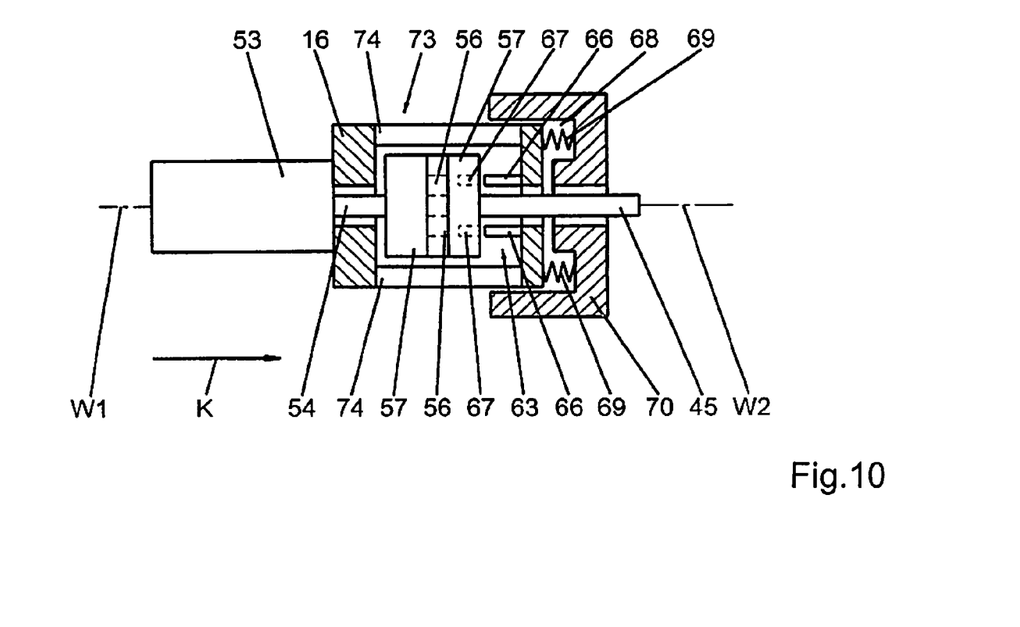
FIG. 10 shows the illustration of the coupling arrangement from FIG. 9 in the coupled state.

A first exemplary embodiment of the locking means 63 is illustrated in FIGS. 9 and 10. For this purpose, the locking means 63 encompass a plate 64, which is arranged coaxially about the drivable shaft 45. The shaft 45 permeates the plate 64 through a central hole 65. On its side, which is assigned to the body 57 of the mating coupling means 52, the plate 64 encompasses one or a plurality of locking bodies 66, wherein a locking recess 67 or a locking hole in the body 57 of the mating coupling means 52 is assigned to each locking body 66. The plate 64 is pretensioned elastically in the direction of the body 57, according to the example via a spring arrangement 68, which, according to the example, encompasses a plurality of coil springs 69. In the case of the exemplary embodiment, the spring arrangement 68 and the plate 64 are enclosed by a ring-shaped wall 70, which is arranged substantially coaxially to the longitudinal axis W2 of the drivable shaft 45.

In the locked position according to FIG. 9, the locking bodies 66, which have a pin-shaped design in the case of the exemplary embodiment, engage with the respectively assigned locking recesses 67. A rotation of the body 57 of the mating coupling means 52 is prevented through this. The mating coupling means 52 is fixed in a coupled position.

By establishing the coupling between the coupling means 36 and the mating coupling means 52, the locked position of the locking means 63 is cancelled by means of an unlocking means 73, which is assigned to the coupling means 36. The unlocking means 73 encompasses one or a plurality of unlocking projections 74, which are oriented in the direction of the longitudinal axis W1 of the drive shaft 54 and which are preferably arranged so as to be evenly distributed around the drive shaft 54. The unlocking projections 74 project beyond the coupling projections 56. Instead of a plurality of unlocking projections 74, a hollow-cylindrical unlocking projection 74 could for example also be arranged around the coupling means 36.

The unlocking means 73 serves to unlock the locking means 63 when establishing the coupling between the coupling means 36 and the mating coupling means 52. This is explained by means of FIG. 10. When establishing the connection between the cross member 16 and a base support 28, the control unit 21 controls the movement of the cross member 16 such that the latter is positioned upstream of the base support 28 such that a movement in coupling direction K, which is oriented parallel to the longitudinal axis L of the cross member 16, can lead to a connection of the connecting means 35 with the mating connecting means 37 as well as to a coupling between the coupling means 36 and the mating coupling means 52. In the case of the exemplary embodiment, the connecting holes 39 are thereby positioned so as to be aligned upstream of the connecting pins 38. In this position, the longitudinal axis W1 of the drive shaft 54 is also aligned with the longitudinal axis W2 of the drivable shaft 45. By linearly displacing in coupling direction K towards the base support 28, the locking pins 38 engage with the locking recesses 39 and establish a mechanical connection between the base support 28 and the cross member 16.

In response to this relative movement in coupling direction K between the base support 28 and the cross member 16, the unlocking projections 74 initially come into contact with the plate 64. By means of the continued relative movement in coupling direction K, the plate 64 is moved through the unlocking projections 74 of the mating coupling means 52 contrary to the spring force of the spring arrangement 68, whereby the locking bodies 66 are moved out of the locking recesses 67. As soon as the locking bodies 66 have been moved out of the locking recesses 67 completely, the rotational position of the mating coupling means 52 and of the drivable shaft 45 is no longer fixed and the rotation is released. In this state, however, the coupling projections 56 have already engaged with the coupling recesses 55. A torque-proof coupling between the coupling means 36 and the mating coupling means 52 and thus between the drive motor 53 and the drivable shaft 45 has been established through this. The establishing of the coupling and of the unlocking of the locking means 63 takes place by means of a simple linear relative movement between cross member 16 and the base support 28. The established coupling and the unlocked state of the locking means 63 are illustrated in FIG. 10 for an exemplary embodiment.

Figure 11:
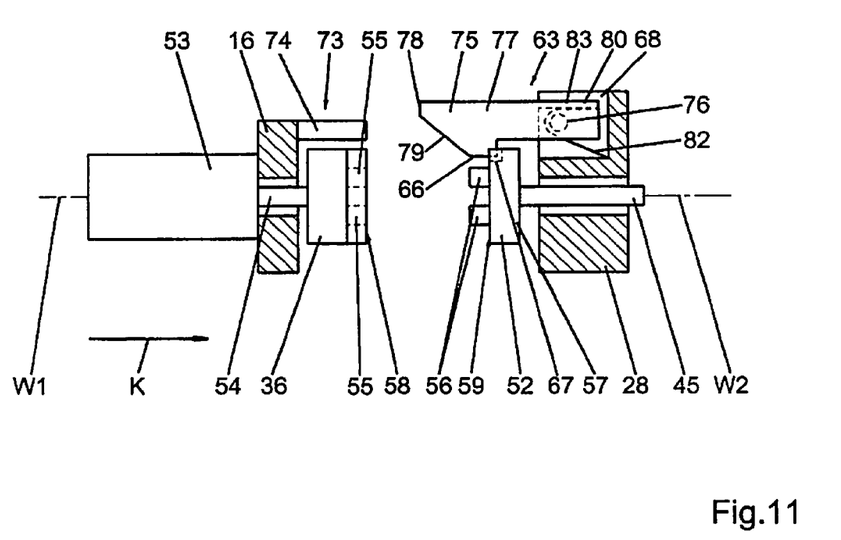
FIG. 11 shows a schematic, block diagram-like partially cut illustration of a second exemplary embodiment of a coupling arrangement in the decoupled state.
Figure 12:
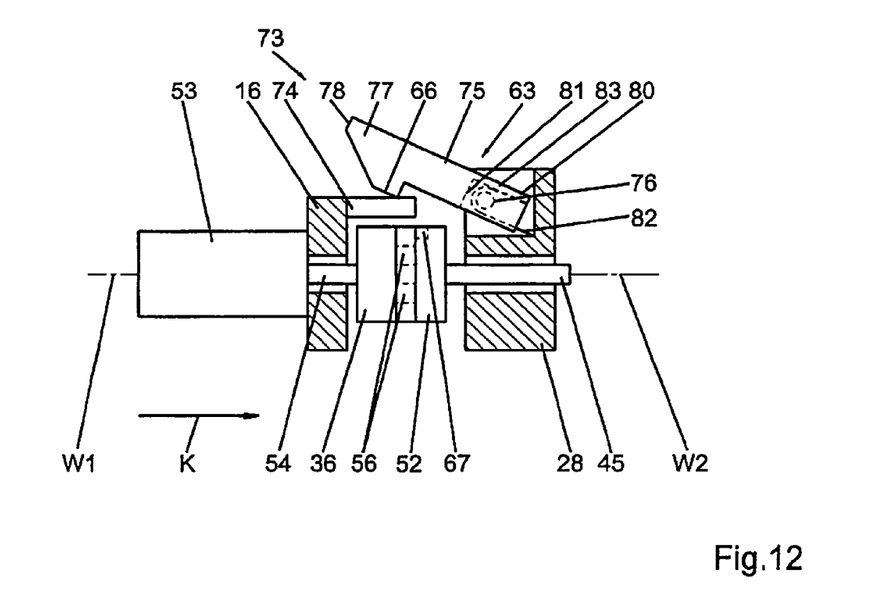
FIG. 12 shows the illustration of the coupling arrangement from FIG. 11 in the coupled state and FIG. 13 shows a schematic block diagram-like illustration of a locking mechanism for establishing a lock between a connecting means and a mating connecting means.

FIGS. 11 and 12 illustrate a second exemplary embodiment for the locking means 63, the unlocking means 73, the coupling means 36 as well as the mating coupling means 52. Contrary to the first embodiment according to FIGS. 9 and 10, the coupling recesses 55 are provided on the coupling means 36 and lead into the coupling surface 58. The assigned coupling projections project away from the mating coupling surface 59 of the mating coupling means 52.

The locking means 63 encompasses a locking latch 75, which is pivotably supported on a pivot pin 76 of the base support 28. The locking latch 75 is pretensioned into a locked position, in which a locking body 66, which is present on the locking latch 75, engages with an assigned locking recess 67. The locking body 66 projects inwardly from the locking latch 75 towards the mating coupling means 52 and in particular radially towards the longitudinal axis W2 of the drivable shaft 45. The locking body 66 is arranged on a first latch lever 77, which, starting at the pivot pin 76, extends away from the base support 28 towards its free end 78. The free end 78 of the first latch lever 77 is spaced apart from the mating coupling means 52 and in particular form the mating coupling surface 59, viewed axially in the direction of the longitudinal axis W2 of the drivable shaft 45. A bezel or inclined plane 79 runs from the free end 78 towards the locking body 66. In the case of the exemplary embodiment, this inclined plane 79 is illustrated so as to be plane. As a modification of this, this inclined plane 79 can also encompass a curved course and can be embodied so as to be convex, for example.

Viewed in opposite direction of extension, a second latch lever 80 follows the first latch lever 77 on the pivot pin 76. A recess 81 is provided in the second latch lever 80 and following the pivot pin 76 in an area of the first latch lever 77. The pivot pin 76 is arranged within this recess 81. The pivot axis, which is formed by means of the pivot pin 76, extends substantially perpendicular to the longitudinal axis W2 of the drivable shaft 45. In the case of this exemplary embodiment, the spring arrangement 68 for pretensioning the locking means 63 into the locked position encompasses a leg spring 82, which is supported on the base support 28 on the one hand and on a side 83 of the second latch lever 80 on the other hand. The side 83 adjoins the recess 81 and runs transversely to the pivot axis. The locking latch 75 is thus pretensioned counter-clockwise about the pivot pin 76 by means of the leg spring 82, whereby the first latch lever 77 or the locking body 66, respectively, is pretensioned counter-clockwise about the pivot pin 76 towards the mating coupling means 52. The locking body 66 thereby engages with the locking recess 67. The mating coupling means 52 is secured against a rotation in this manner, whereby the coupling projections 56 are held in a coupled position.

The unlocking means 72 is formed by an unlocking projection 74, which extends approximately parallel to the drive shaft 54 and which is arranged next to the coupling means 36. When the connection is established, the locking projection 74 comes into contact with the incline plane 79. Due to the relative movement between the cross member 16 and the base support 28, the locking projection 74 continues to glide along the inclined plane 79 and thereby pivots the locking latch 75 against the spring force and the pivot pin 76. The locking body 66 thus becomes disengaged from the locking recess or the locking hole 67, respectively. In response to a completely established coupling, the coupling projections 56 engage with the assigned coupling recesses 55. The established coupling is illustrated in FIG. 12.

In the case of all of the exemplary embodiments, the establishing of the coupling and the unlocking of the locking means 63 thus takes place by means of a linear relatively movement between the cross member 16 and the base support 28 in coupling direction K. In the case of the first exemplary embodiment according to FIGS. 9 and 10 as well as in the case of the second exemplary embodiment according to FIGS. 11 and 12, the control unit 21 brings the drive motor 53 and thus the coupling means 36 into a rotational position, in which the coupling between the coupling means 36 and the mating coupling means 52 can be established by means of a linear relative movement in coupling direction K. In the case of the exemplary embodiments illustrated herein, this takes place in that the coupling projections 56 are oriented so as to be aligned with the coupling recess 55 when the longitudinal axis W1 of the drive shaft 54 and the longitudinal axis W2 of the drivable shaft 45 correspond with one another.

The same process is applied to release the coupling between the coupling means 36 and the mating coupling means 52.

The control unit 21 brings the mating coupling means 52 into a rotational position, in which a locking can take place by means of the locking means 63. Through this, the at least one locking recess 67 is brought into a rotational position, with which the locking body 66 can engage due to the pretensioning force. In the event that the cross member 16 is subsequently moved away from the base support 28 by means of a linear relative movement opposite the coupling direction K, the coupling between the coupling means 36 and the mating coupling means 52 is separated. According to the example, the coupling projections 56 become disengaged from the coupling recesses 55. The at least one locking body 66 is moved into its locked position by means of the spring force of the spring arrangement 68 and engages with the assigned locking recess or the assigned locking hole 67, respectively. In this locked position, a rotation of the mating coupling means 52 is prevented (FIGS. 9 and 11).

FIG. 3 illustrates a basic alternative of the base support 28. Different movements of the gripping arrangement 29 of the base support 28 can be initiated via the drivable shaft 45, the output member 48 as well as the gear drive 49. Different alternatives or types of the base support 28 are available for this. In the case of the exemplary embodiments of the base support according to FIGS. 6 to 8, provision is made for different gear drives 49, which convert the linear movement of the output member 46 into a linear movement or pivot movement of the gripping arrangement 29. It goes without saying that, as an alternative to this, provision can also be made for other gear drives 49. Combinations of the gear drives 49 described herein are also possible.

Figure 6:
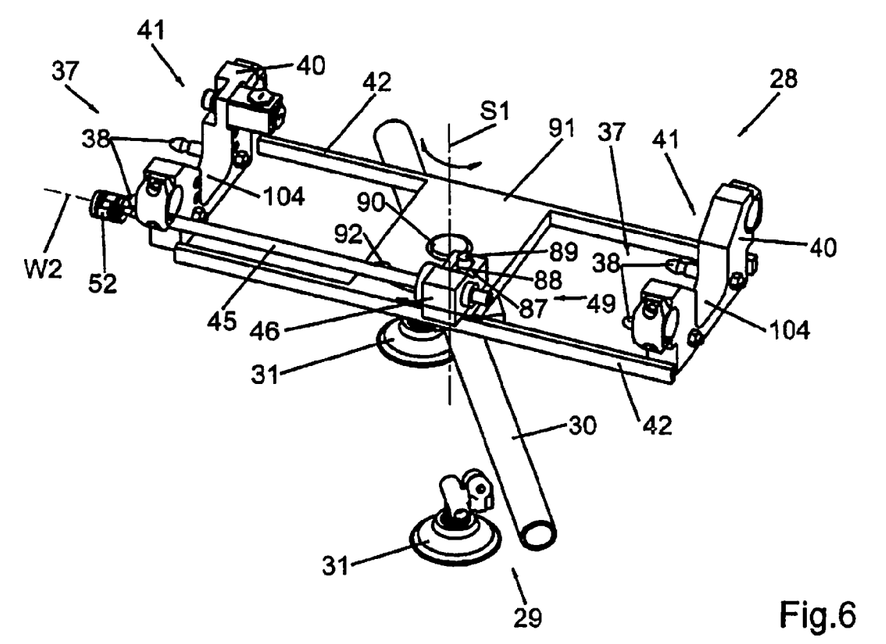
FIG. 6 shows an exemplary embodiment of a base support comprising a pivotable workpiece gripping arrangement according to FIG. 5 in perspective illustration.

A first alternative of the base support 28 comprising a first pivot axis S1 is illustrated in FIG. 6. The output member 46 is fixedly connected to a slide part 87. The slide part 87 encompasses a slide groove 88, which is embodied as a straight slit. The slide groove 88 is oriented transversely and in particular perpendicular to the longitudinal axis W2 of the drivable shaft 45. A slide block 89, which encompasses a conical shape in the case of the exemplary embodiment, can be moved so as to be guided along the slide groove 88. The slide block 89 is fixedly connected to the bar 30 of the workpiece holding arrangement 29. The bar 30 is supported on the base support 28 so as to be capable of pivoting on a pivot pin 90 at a distance to the slide block 89. The pivot pin 90 defines the first pivot axis S1, which runs transversely to the longitudinal axis W2 of the drivable shaft 45 in the case of the exemplary embodiment. Once the connection between the cross member 16 and the base support 28 has been established according to the first alternative according to FIG. 6, the first pivot axis S1 permeates the cross member 16 and is aligned perpendicular to a plane, in which the two longitudinal bars 42 of the base support 28 run.

Figure 5:
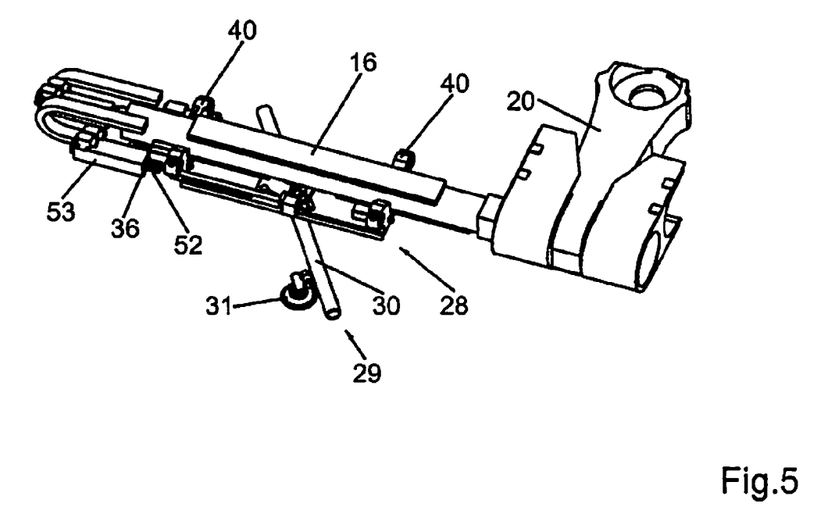
FIG. 5 shows a perspective illustration of the embodiment of the cross member according to FIG. 2 comprising a coupled base support.

A connecting piece 91, in which the pivot pin 90 is rotatably supported, is placed between the two longitudinal bars 42. In the connecting piece 91, provision is made at a distance to the pivot axis S1 for a curved slit or aperture 92, which projects through the slide block 89, starting at the bar 30, and which projects into the slide groove 88. A linear movement of the output member 56 thus leads to a pivot movement of the bar 30 and thus of the suction elements 31 about the first pivot axis S1. The established connection between the first alternative of the base support 28 according to FIG. 6 with the cross member 16 is illustrated in FIG. 5.

Figure 7:
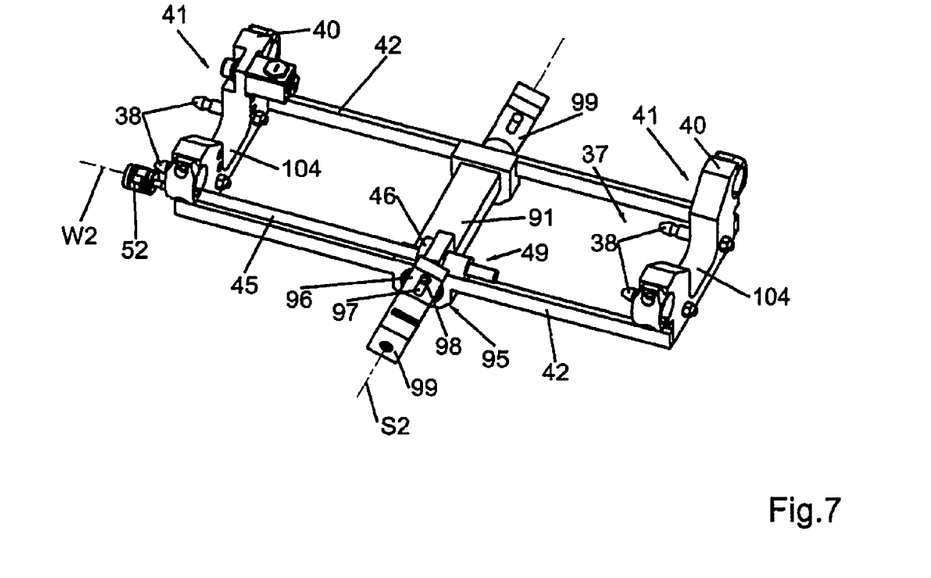
FIG. 7 shows a further embodiment of a base support comprising a pivotable workpiece gripping arrangement in perspective illustration.

FIG. 7 shows a further alternative of the base support 28. The connecting piece 91 between the two longitudinal bars 42 thereby serves as support for a pivot bearing 95, which extends transversely between the two longitudinal bars 42. The pivot bearing 95 defines a second pivot axis S2, which extends transversely to the longitudinal axis W2 of the drivable shaft 45 and substantially parallel to a plane, in which the two longitudinal bars 42 are located. A pivot lever 96, which is pivotably supported by means of the pivot bearing 95, projects away transversely to the second pivot axis S2. A slit 97, with which a pin 98 engages, is introduced into this pivot lever 96. The pin 98 is indirectly or directly fastened to the output member 46. The pin 98, together with the output member 46, moves along the drivable shaft 45. In response to this movement, the pivot lever 96 is moved about the second pivot axis S2. The gripping arrangement 29 can be fastened to axial fastening pieces 99, which are connected to the pivot lever 96 and which extend substantially along the second pivot axis S2. The bars 30 thereby extend substantially perpendicular to the second pivot axis S2.

In the case of a third alternative of the base support 28 according to FIG. 8, a linearly displaceable support carriage 103 is arranged on both longitudinal bars 42. The support carriage 103 is connected to the output member 46, so that a linear movement of the output member 46 leads to a corresponding linear movement of the support carriage 103. The output member 46 and the support carriage 103 thus move together in the direction of the longitudinal axis W2 of the drivable shaft 45 when the shaft 45 rotates. The gripping arrangement 29, which can be moved or positioned, respectively, in accordance with the displacement of the support carriage 103, is fastened to the support carriage 103. In the case of the exemplary embodiment shown in FIG. 8, the bars 30 thereby extend approximately parallel to the longitudinal axis W2 of the drivable shaft 45.

In the case of all of the exemplary embodiments, the two end pieces 40 of a base support 28 encompass a cross member accommodation 104. The cross member accommodation 104 is a recess in an end piece 40, which is open towards the cross member 16 when the connection has been established. The two cross member accommodations 104 of a base support 28 are oriented so as to be aligned with one another, viewed in the direction of the longitudinal bars 42. Once the connection of the base support 28 with the cross member 16 has been established, the cross member 16 permeates the cross member accommodation 104 in longitudinal direction L and can rest against the base support 28 at that location at least in places. A contact of the cross member 16 with the base support 28 in the area of the cross member accommodation 104, however, is not necessary.

Figure 13:
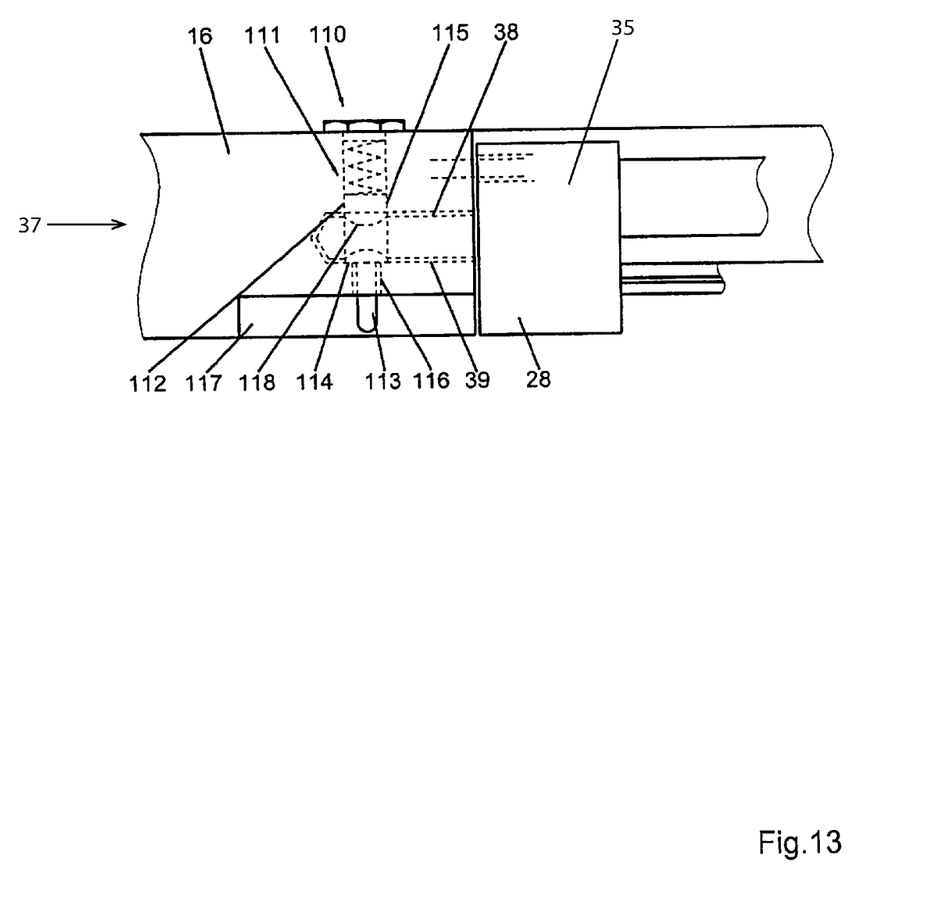

To prevent an unintentional release of the mechanical connection between the connecting means 35 and the mating connecting means 37, provision can be made for a locking mechanism 110, which can be released by means of a push button switch, as is described in DE 10 2006 025 272 B2. Reference is expressly made to the content of this patent specification in this respect. FIG. 13 schematically illustrates a locking mechanism 110 using the example of a connecting pin 38 and a connecting hole 39. A locking mechanism can be assigned to a plurality of or to every connecting pin 38 or connecting hole 39, respectively.

A push button switch 111 is arranged in the cross member 16 transversely to the connecting hole 39. The push button switch 111 encompasses a first cylindrical section 112 having a larger thickness and a second cylindrical section 113 having a smaller thickness, which connect to one another axially. A spring acts on the first cylindrical section 112 and it is pretensioned against a ring-shaped stop surface 114. The ring-shaped stop surface 114 represents a step between a first hole section 115 and a second hole section 116 of a hole, which runs transversely to the connecting hole 39 and which permeates it. The second cylindrical section 113 of the push button switch 111 projects out of the second hole section 116 and can be accessed from outside the cross member 16. In the case of the preferred exemplary embodiment, this part of the second cylindrical section 113 is arranged in a depression or recess 117 of the cross member 16. In the event that the cross member 16 is set up on a storage surface for removing a base support 28, an actuating projection of the storage surface presses the second cylindrical section 113 axially inwards, wherein the first cylindrical section 112 moves out of the connecting hole 39, away from the stop surface 114. In this state, the connecting pin 38 can be pulled axially out of the connecting hole 39.

In FIG. 13, the locking mechanism 110 is in the locked state, wherein the first cylindrical section 112 having a larger diameter of the push button switch 111 permeates the connecting hole 39 directly adjacent to a diminution 118 of the connecting pin 38, whereby an axial movement of the connecting pin 38 is blocked in its direction of extension. The connection between the connecting means 35 and the mating connecting means 37 can only be released when the first cylindrical section 112 is moved out of the connecting hole 39.

The invention relates to a transfer arrangement for transporting and/or positioning and/or aligning a workpiece and is used in particular in presses or press lines. A cross member 16 can be moved and/or pivoted in a plurality of directions in space. The movement of the cross member 16 is controlled or regulated by means of a control unit 21 and by means of a corresponding number of axial drives. A servomotor 53, which is also activated by means of the control unit 21, is located on the cross member 16. A base support 28 can be coupled to the cross member 16 with the help of a coupling arrangement 27. A drivable shaft 45 is arranged on the base support 28. The coupling arrangement 27 of the cross member 16 encompasses a connecting means 35 or 35a and 35b, respectively, which interacts with a mating connecting means on the base support 28 to establish the mechanical fastening. The coupling arrangement 27 furthermore encompasses a coupling means 36, which interacts with a mating coupling means 52 on the rotatable shaft 45 to establish a rotational connection between the servomotor 53 and the drivable shaft 45. The control unit 21 is equipped to carry out an automatic coupling and removal of the base support 28 by means of a controlled movement of the cross member 16 and an activation of the servomotor 53. A workpiece gripping arrangement 29 for holding the workpiece is present on the base support 28. Different workpiece gripping arrangements 29 or different base support types 28 can be connected to the cross member 16 in this manner.

LIST OF REFERENCE NUMERALS 15 transfer arrangement
16 cross member
17 arm
18 pivot lever
19 column
20 bearing part
21 control unit
27 coupling arrangement
28 base support
29 workpiece gripping arrangement
30 bar
31 suction element
35 connecting means
35a group
35b group
36 coupling means
37 mating connecting means
38 connecting pins
39 connecting hole
40 end piece
41 connecting surface
42 longitudinal bar
45 shaft
46 output member
47 threaded spindle
48 spindle nut
49 gear drive
52 mating coupling means
53 drive motor
54 drive shaft
55 coupling recess
56 coupling projection
57 cylindrical body
58 coupling surface
59 mating coupling surface
63 locking means
64 plate 65 central hole
66 locking body
67 locking recess
68 spring arrangement
69 coil spring
70 wall
73 unlocking means
74 unlocking projection
75 locking latch
76 pivot pin
77 first latch lever
78 free end
79 inclined surface
80 second latch lever
81 recess
82 leg spring
83 side
87 slide part
88 slide groove
89 slide block
90 pivot pin
91 connecting piece
92 aperture
95 pivot bearing
96 pivot lever
97 slit
98 pin
99 axial fastening piece
103 support carriage
104 cross member accommodation
110 locking mechanism
111 push button switch
112 first cylindrical section
113 second cylindrical section
114 stop surface
115 first hole section
116 second hole section
117 recess
118 diminution
A1 first axis
A2 second axis
A3 third axis
K coupling direction
L longitudinal axis of the cross member
S1 first pivot axis
S2 second pivot axis
W1 longitudinal axis of the drive shaft
W2 longitudinal axis of the drivable shaft The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A transfer arrangement (15) for transporting and/or aligning a workpiece for a press or press line comprising:
a cross member (16), which can be moved and/or pivoted in a plurality of directions in space and which is configured to be releasably fastened to an interchangeable base support (28) which when fastened to the cross member (16) is configured to be moved and/or pivoted in a plurality of directions in space for transporting and/or aligning the workpiece, the interchangeable base support (28) includes a drivable shaft (45) carrying a mating coupling member (52) operatively attached thereto,
the cross member (16) includes a motor coupling arrangement (27), which is mounted on the cross member (16), which is configured for releasably coupling the interchangeable base support (28) to the cross member (16), the cross member (16) together with the attached motor coupling arrangement (27) is configured to be completely detachable from interchangeable base support (28), the motor coupling arrangement (27) includes a drive motor (53) carried by the cross member (16), the drive motor (53) includes a drive shaft (54) attached thereto in operative arrangement with a coupling member (36), which when the cross member (16) is fastened to the interchangeable base support (28) is configured to releasably couple or decouple the motor (53) by engagement or disengagement with the mating coupling member (52) carried on the interchangeable base support (28),
wherein the coupling member (36) is configured upon attachment of the interchangeable base support (28) to the cross member (16) to be in engagement with the mating coupling member (52) in a coupled state to be driven by the drive motor (53) and to interact with the mating coupling member (52) for establishing a rotational connection to the driveable shaft (45) of the interchangeable base support (28),
a workpiece gripping arrangement (29) positioned on the interchangeable base support (28) and adapted for gripping the workpiece,
wherein the cross member (16) further includes a connecting means (35) carried thereon, which is configured to interact with a mating connecting means (37) which is operably positioned on the interchangeable base support (28) for mechanical attachment or detachment with the connecting means (35), for the releasable mechanical fastening or detachment of the interchangeable base support (28) to the cross member (16).

2. The transfer arrangement according to claim 1, characterized in that the connecting means (35) is coupled to the mating connecting means (37) and the coupling member (36) is coupled to the mating coupling member (52) by a relative movement of the cross member (16) relative to the interchangeable base support (28) in a coupling direction (K).

3. The transfer arrangement according to claim 2, characterized in that the coupling direction (K) runs parallel to the longitudinal axis (L) of the cross member (16).

4. The transfer arrangement according to claim 1, further including a control unit (21) for controlling the movement and the position of the cross member (16) and for activating the drive motor (53).

5. The transfer arrangement according to claim 4, characterized in that the control unit (21) brings the coupling member (36), which is connected to drive motor (53), into the coupled position to establish the coupling between the coupling member (36) and the mating coupling member (52).

6. The transfer arrangement according to claim 1, characterized in that the coupling member (36) includes an unlocking means (73), which unlocks a rotational locking of the mating coupling member (52) in response to establishing a rotational connection between coupling member (36) and the mating coupling member (52).

7. The transfer arrangement according to claim 1, characterized in that the cross member (16) is only supported on one side.

8. The transfer arrangement according to claim 1, characterized in that a plurality of different interchangeable base supports (28) are present, which can be connected to the cross member (16).

9. The transfer arrangement according to claim 1,
wherein the interchangeable base support (28) further comprises:
the drivable shaft (45) in operative arrangement with an output member (46), which is configured to be moved by the drivable shaft (45) and which is connected to the workpiece gripping arrangement (29) via a gear drive (49),
a locking means (63) connected to the mating coupling member (52), which, in a decoupled state of the mating coupling member (52) from the coupling member (36), fixes the rotational position of the mating coupling member (52), the locking means (63) includes at least one locking body (66), which, in the locked position, engages with a locking recess (67) on the mating coupling member (52).

10. The transfer arrangement according to claim 9, characterized in that the locking means (63) is configured to be pretensioned into the locked position by a spring arrangement (68).

11. The transfer arrangement according to claim 9, characterized in that the drivable shaft (45) is configured as a threaded spindle (47) and the output member (46) is configured as a spindle nut (48).

12. The transfer arrangement according to claim 9, characterized in that the output member (46) is connected to a support carriage (103), which is supported so as to be linearly displaceable and on which the workpiece gripping arrangement (29) is arranged.

13. The transfer arrangement according to claim 9, characterized in that the workpiece gripping arrangement (29) is supported so as to be pivotable about a pivot axis (S1, S2) and that the output member (46) is connect to a slide block (89) and a pivot lever (96), which is arranged on the workpiece gripping arrangement (29).

* * * * *